United States Patent
Ong et al.

(10) Patent No.: US 9,733,855 B1
(45) Date of Patent: Aug. 15, 2017

(54) SYSTEM AND METHODS FOR ADJUSTING MEMORY COMMAND PLACEMENT

(71) Applicant: Altera Corporation, San Jose, CA (US)

(72) Inventors: Yu Ying Ong, Ampang (MY); Gordon Raymond Chiu, North York (CA); Muhamad Aidil Jazmi, Sungai Rambai (MY); Teik Ming Goh, Ipoh (MY)

(73) Assignee: Altera Corporation, San Jose, CA (US)

( * ) Notice: Subject to any disclaimer, the term of this patent is extended or adjusted under 35 U.S.C. 154(b) by 283 days.

(21) Appl. No.: 13/734,512

(22) Filed: Jan. 4, 2013

(51) Int. Cl.
 *G06F 12/00* (2006.01)
 *G06F 3/06* (2006.01)
 *G06F 1/12* (2006.01)

(52) U.S. Cl.
 CPC .............. *G06F 3/0629* (2013.01); *G06F 1/12* (2013.01); *Y02B 60/1225* (2013.01); *Y02B 60/1228* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 4,410,943 A | * | 10/1983 | Barlow .................. | G06F 13/18 711/151 |
| 5,537,640 A | * | 7/1996 | Pawlowski et al. ................... | G06F 12/0653 710/105 |
| 5,684,978 A | | 11/1997 | Sarma et al. | |
| 5,768,560 A | * | 6/1998 | Lieberman et al. .......... | 711/167 |
| 5,778,446 A | * | 7/1998 | Kim ..................... | G06F 13/1689 711/105 |
| 6,553,472 B2 | * | 4/2003 | Yang et al. .................... | 711/167 |
| 7,181,584 B2 | | 2/2007 | LaBerge | |
| 7,697,332 B2 | | 4/2010 | Qu et al. | |
| 8,099,567 B2 | | 1/2012 | Shrader et al. | |
| 8,261,121 B2 | | 9/2012 | Methar et al. | |
| 8,327,104 B2 | * | 12/2012 | Smith et al. ................... | 711/167 |

OTHER PUBLICATIONS

"JEDEC Announces Key Attributes of Upcoming DDR4 Standard" JEDEC, Aug. 22, 2011 (3 pages) [Retrieved on Jan. 4, 2013]. Retrieved from the Internet<URL:http://www.jedec.org/news/pressreleases/jedec-announces-key-attributes-upcoming-ddr4-standard>.

* cited by examiner

*Primary Examiner* — Matthew Bradley
(74) *Attorney, Agent, or Firm* — Treyz Law Group; Vineet Dixit

(57) ABSTRACT

Integrated circuits may include memory interface circuitry operable to communicate with memory. The memory interface circuitry may include a memory controller and a memory interface circuit. The memory controller may fulfill memory access requests using the memory interface circuit. The memory controller may operate based on controller clock cycles of a controller clock, whereas the memory interface circuit may operate based on memory clock cycles of a memory clock. Each controller clock cycle may have a set of corresponding memory clock cycles. The memory interface circuitry may be configured using logic design computing equipment. The logic design computing equipment may identify memory timing requirements and controller latency requirements. The computing equipment may determine a command placement configuration that satisfies the timing and latency requirements. The computing equipment may configure the integrated circuit with the command placement configuration.

21 Claims, 9 Drawing Sheets

SYSTEM AND METHODS FOR ADJUSTING MEMORY COMMAND PLACEMENT

BACKGROUND

Programmable integrated circuits are a type of integrated circuit that can be configured by a user to implement custom logic functions. In a typical scenario, a logic designer uses computer-aided design (CAD) tools to design a custom logic circuit. When the design process is complete, the CAD tools generate configuration data. The configuration data is loaded into a programmable integrated circuit to configure the device to perform desired logic functions.

In a typical system, a programmable integrated circuit, memory devices, and other electronic components are mounted on a printed circuit board. The programmable integrated circuit includes memory interface circuitry that is used to relay data back and forth between the programmable integrated circuit and the memory devices (i.e., the memory interface circuitry is used to read data from and write data into the memory devices). The memory interface circuitry communicates with the memory devices by issuing memory commands at memory clock cycles of a memory clock.

As memory clock speeds increase, it may be difficult for the memory interface circuitry to relay data back and forth between the programmable integrated circuit and the memory devices. For example, the memory interface circuitry may communicate with the integrated circuit at clock speeds that are lower than the memory clock speeds. In this scenario, the memory interface circuitry can accommodate the mismatch in clock speeds by issuing multiple memory commands during each clock cycle of the integrated circuit. However, due to processing limitations of the memory interface circuitry, it is challenging for the memory interface circuitry to generate and issue multiple memory commands for each integrated circuit clock cycle.

SUMMARY

Integrated circuits such as programmable integrated circuits having memory interface circuitry are provided. The memory interface circuitry may be used to communicate with off-chip memory devices by issuing memory commands to the memory devices. The memory devices may be organized in rows and columns.

The memory interface circuitry may include a memory controller and a memory interface circuit. The memory controller may fulfill memory access requests using the memory interface circuit. The memory controller may operate based on controller clock cycles of a controller clock, whereas the memory interface circuit may operate based on memory clock cycles of a memory clock. Each controller clock cycle may have a set of corresponding memory clock cycles (e.g., memory clock cycles within the controller clock cycle).

The memory interface circuitry may be configured using logic design computing equipment. The logic design computing equipment may identify timing requirements associated with issuing the memory commands to the memory. The timing requirements may, for example, include row-to-column timing requirements. The computing equipment may determine a command placement configuration that satisfies the timing requirements. The command placement configuration may identify when the memory commands should be issued to the memory.

The logic design computing equipment may identify latency requirements associated with the memory controller. The latency requirements may be associated with latency of the memory controller in processing memory access requests. The logic design computing equipment may satisfy latency requirements by selecting a command placement configuration so that column commands following row commands are issued during different controller clock cycles for a memory controller with increased latency. If desired, the computing equipment may select the command placement configuration so that column commands following row commands are issued during the same controller clock cycle for a memory controller with reduced latency.

If desired, the memory interface circuitry may be controlled during normal operation by control circuitry on the integrated circuit. The control circuitry may dynamically determine which memory clock cycles in which memory commands are issued to the memory by the memory interface circuitry.

Further features of the present invention, its nature and various advantages will be more apparent from the accompanying drawings and the following detailed description.

DETAILED DESCRIPTION

Embodiments of the present invention relate to integrated circuits containing memory interface circuitry. The memory interface circuitry may be used to interface with off-chip memory such as random-access memory (RAM). The integrated circuits may be digital signal processors, microprocessors, application specific integrated circuits, or other suitable integrated circuits. These types of integrated circuits that are operable to communicate with system memory can benefit from memory interface circuitry having adjustable command placement capabilities.

Figure 1:
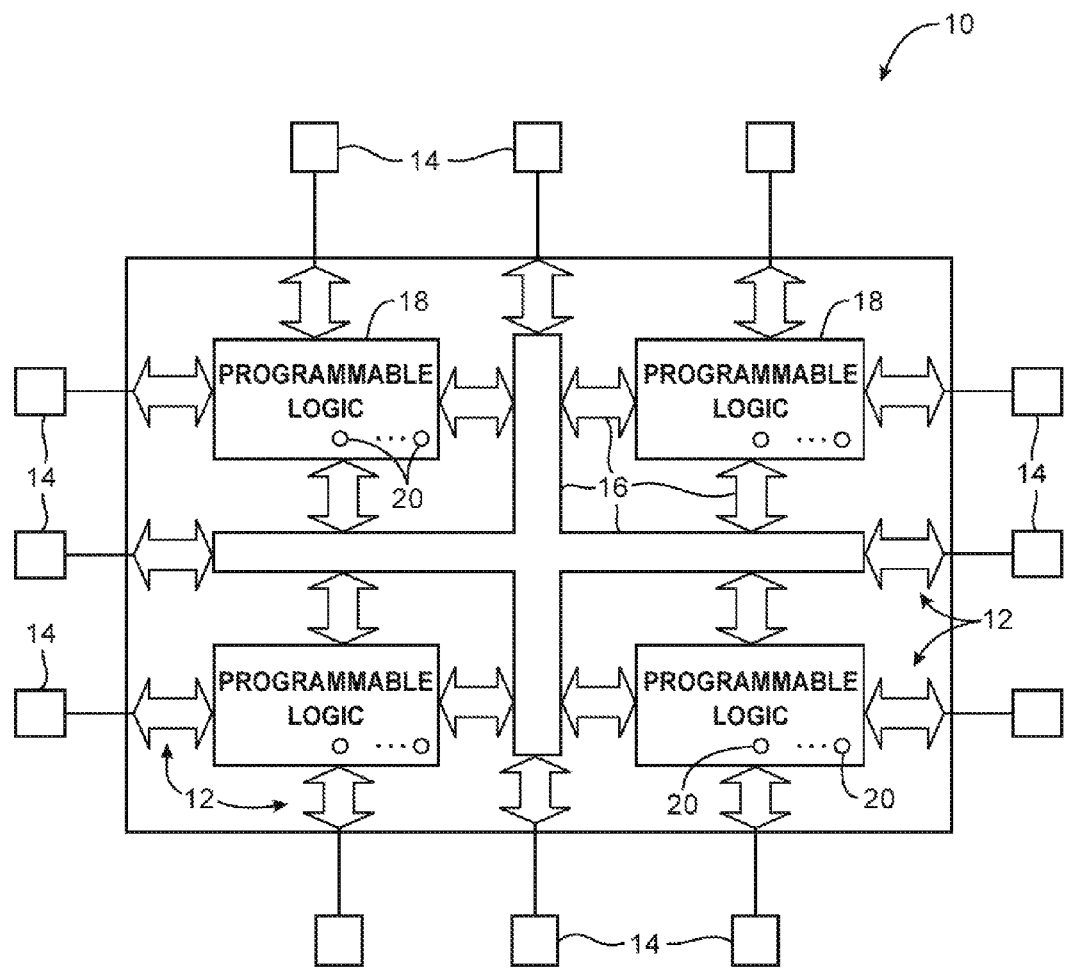
FIG. 1 is a diagram of an illustrative programmable integrated circuit in accordance with an embodiment of the present invention.

As an example, an integrated circuit such as a programmable integrated circuit may include memory interface circuitry. This is merely illustrative and does not serve to limit the scope of the present invention. If desired, application specific integrated circuits, microprocessors, and other application specific standard products may contain memory interface circuitry. FIG. 1 shows a diagram of an illustrative programmable integrated circuit device. As shown in FIG. 1, device 10 may have input-output (I/O) circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. For example, programmable logic 18 may include look-up tables, registers, and multiplexers. The programmable logic 18 may be configured to perform a custom logic function. The programmable interconnects associated with interconnection resources may be considered to be a part of programmable logic 18.

Programmable logic 18 contains programmable elements 20. Programmable elements 20 may be based on any suitable programmable technology, such as fuses, antifuses, electrically-programmable read-only-memory technology, random-access memory cells, mask-programmed elements, etc. As an example, programmable elements 20 may be formed from memory cells. During programming, configuration data is loaded into the memory cells using pins 14 and input-output circuitry 12. The memory cells are typically random-access-memory (RAM) cells. Because the RAM cells are loaded with configuration data, they are sometimes referred to as configuration RAM cells (CRAM).

Programmable element 20 may be used to provide a static control output signal for controlling the state of an associated logic component in programmable logic 18. The output signals generated by elements 20 are typically applied to gates of metal-oxide-semiconductor (MOS) transistors (sometimes referred to as pass gate transistors).

The circuitry of device 10 may be organized using any suitable architecture. As an example, logic 18 of programmable device 10 may be organized in a series of rows and columns of larger programmable logic regions, each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Other device arrangements may use logic that is not arranged in rows and columns.

Figure 2:
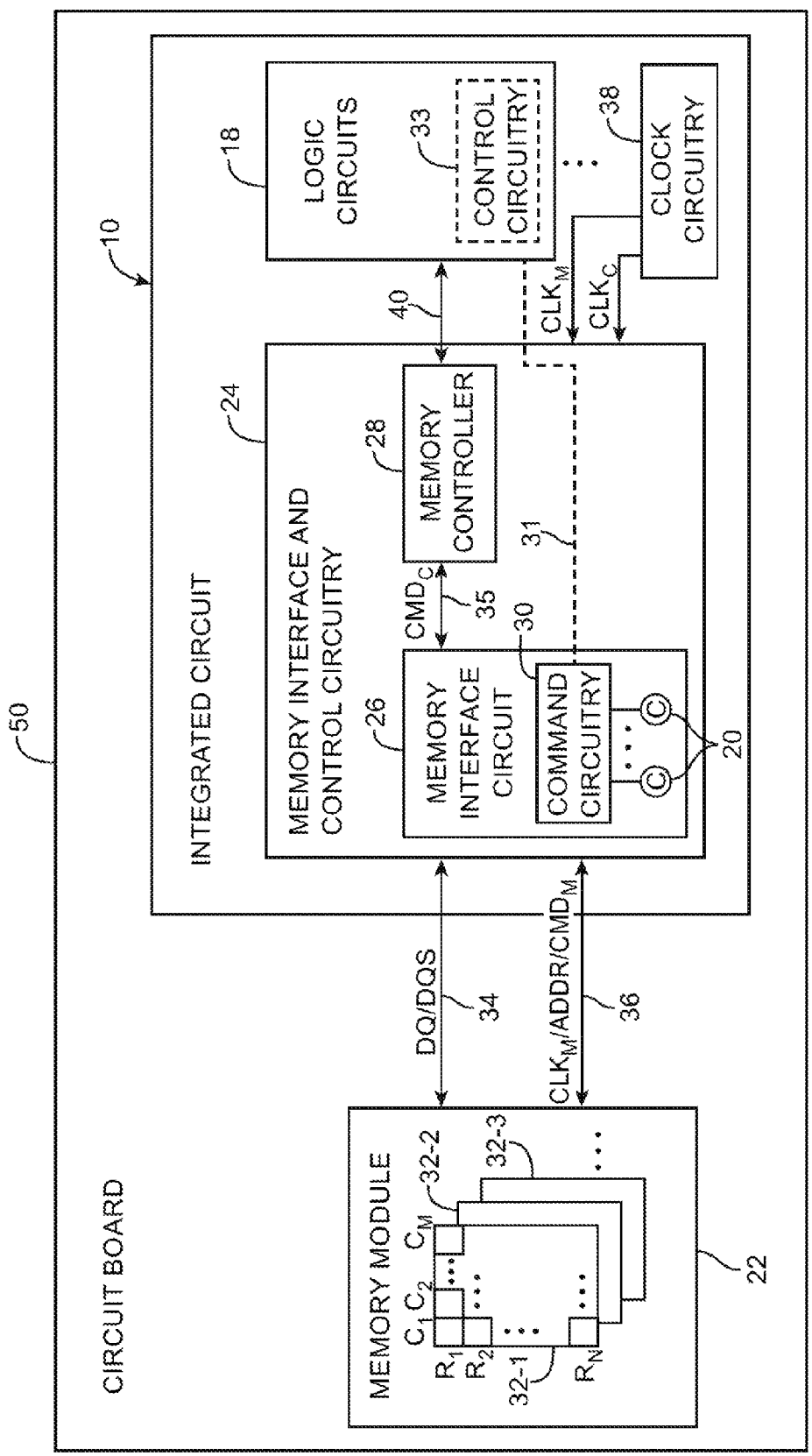
FIG. 2 is a diagram of an illustrative integrated circuit operable to communicate with a memory module in accordance with an embodiment of the present invention.

Device 10 may communicate with off-chip memory such as memory module 22 (see, e.g., FIG. 2). Memory module 22 may be a memory device sometimes referred to as a single in-line memory module (SIMM) or a dual in-line memory module (DIMM). Device 10 may be configured to communicate with at least two memory modules 22, at least four memory modules 22, etc. As shown in FIG. 2, integrated circuit 10, memory module 22, and other circuit components (e.g., integrated circuit chips, surface mount components, etc.) may be mounted on a circuit board 50. Circuit board 50 may, for example, be a rigid printed circuit board (PCB), a flexible circuit board (sometimes referred to as a flex circuit), a rigid flex circuit, or other suitable types of substrates. Board components may be interconnected through conductive traces and packaging (e.g., sockets into which integrated circuits are mounted) formed on board 50.

Device 10 may include memory interface circuitry 24 (sometimes referred to as memory interface and control circuitry) that serves to relay information between memory module 22 and logic circuits 18 that are internal to device 10. Memory interface circuitry 24 may include memory interface circuit 26 and memory controller 28. Read/write data may be conveyed between memory interface circuitry 24 and logic circuits 18 via path 40. For example, write data may be conveyed along with write access requests from logic circuits 18 to memory controller 28. Memory controller 28 may be configured to generate appropriate control signals corresponding to the memory protocol currently under use (e.g., circuit 28 may handle memory data management to address desired banks, rows, and columns and to perform memory refresh).

The arrangement of FIG. 2 is merely illustrative and is not intended to limit the scope of the present invention. Integrated circuits other than programmable integrated circuits may similarly include memory interface circuitry 24 that is used to communicate with one or more memory modules 22.

Memory interface circuit 26 may interface with memory module 22. Memory interface circuit 26 may receive control signals such as CMDC from memory controller 28 and control memory module 22 to fulfill memory access requests. For example, memory interface circuit 26 may generate memory command signal CMDM based on controller command signal CMDC. Memory interface circuit 26 may be operable to perform desired data rate conversions and, together with memory controller 28, may be operable to generate signals that meet timing requirements specified by the memory protocol currently under use and/or memory module 22.

Memory interface circuit 26 may be coupled to memory module 22 through paths 34 and 36. During memory read operations, data (DQ) signals and data strobe (DQS) signals may be conveyed from memory module 22 to memory interface circuit 26 over path 34. During memory write operations, DQ/DQS may be conveyed from memory interface circuit 26 to memory module 22 over path 34.

During read and write operations, control signals such as clock CLKM, address ADDR, and command CMDM signals may be conveyed from memory interface circuitry 24 to memory module 22 over path 36. Signal CLKM may serve as a memory reference clock (e.g., a reference clock to which the DQS signals, address signal ADDR, and command signal CMDM should be aligned). Signal CMDM may be configured to a first value to initiate a read operation, to a second value to initiate a write operation, to a third value during normal operation, and to other values to initiate any desired operations (e.g., to issue commands to memory module 22 that initiate the desired operations). Signal ADDR specifies the address (e.g., a selected bank address in a memory device) from which data is read out during read operations and the address to which data is written during write operations.

Memory module 22 may be organized into banks 32 (e.g., banks 32-1, 32-2, 32-3, etc.) having rows and columns. Each bank 32 may include rows R1, R2, . . . , RN and columns C1, C2 . . . , CM. In general, each bank 32 may include any desired number of rows and columns (e.g., N and M may be any desired numbers). To access a particular memory location in memory module 22, an activate command and a memory address may be provided by memory interface circuitry 24 via paths 36. The activate command may activate (open) a row of a bank that is identified by the memory address, which prepares the row for subsequent read and write access. Subsequently, memory interface circuitry 24 may provide read and/or write commands to access desired columns in the row. For example, read commands may be provided to read data from desired columns in the row, whereas write commands may be provided for writing data into desired columns in the row. In order to subsequently access a different row in the selected bank, memory interface circuitry 24 must first de-activate (close) the current row by providing a precharge command via paths 36.

Memory commands that are associated with row operations may sometimes be referred to herein as row commands. For example, activate commands that open an entire row of a memory bank 32 or precharge commands that close an entire row may be referred to as row commands. Commands that are associated with column operations may sometimes be referred to herein as column commands. For example, read and write commands that access columns within a row may be referred to as column commands.

Memory controller 28 may operate using clock CLKC. Controller clock CLKC and memory clock CLKM may be generated by clock circuitry 38. As memory operating frequencies are increased for improved memory performance, it may be difficult for memory controller 28 to process memory access requests with sufficient speed. For example, memory module 22 may operate at speeds of 200 MHz, 400 MHz, 800 MHz, or more (e.g., CLKM may have a frequency of 200 MHz, 400 MHz, 800 MHz, etc.). At these frequencies, it may be difficult for memory controller 28 to process memory access requests from logic circuits 18 properly (e.g., because delay paths within memory controller 28 may cause signal delays that exceed clock periods at these frequencies). It may be desirable to operate memory controller 28 at a reduced controller clock speed so that memory controller 28 can process memory access requests.

In order to accommodate increased memory clock speeds while maintaining memory controller clock speeds at acceptable levels, memory controller 28 may be configured to issue controller commands having multiple memory commands at each controller clock cycle. Command circuitry 30 may receive the controller commands and issue corresponding memory commands at selected memory clock cycles. The memory clock cycles at which the memory commands are issued may be controlled via programmable elements 20. If desired, optional control circuitry 33 may control which memory clock cycles in which the memory commands are issued (e.g., by providing appropriate control signals via path 31).

Figure 3:
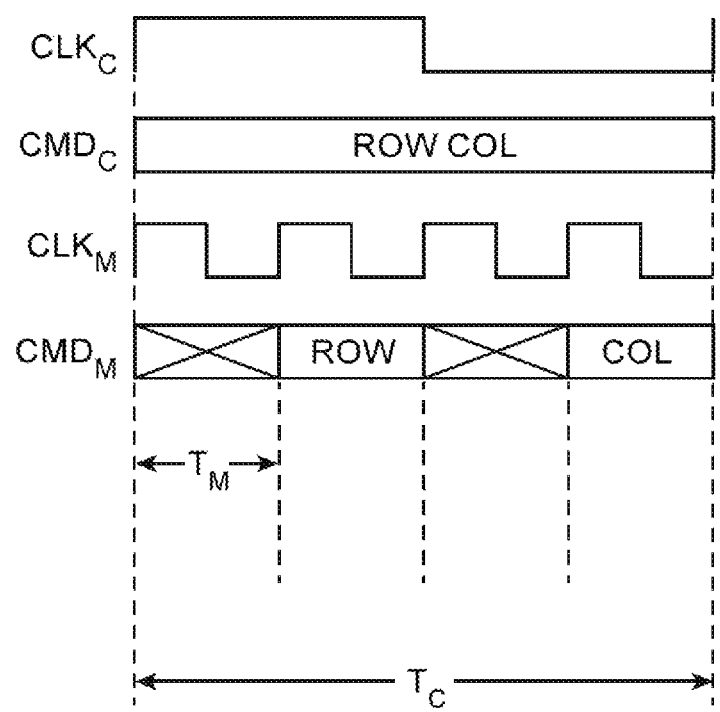
FIG. 3 is an illustrative timing diagram showing how a memory controller may operate at a reduced clock speed relative to a memory module in accordance with an embodiment of the present invention.

FIG. 3 is an illustrative timing diagram showing how memory controller 28 may operate at a reduced clock speed relative to memory module 22. Controller clock CLKC may operate at a first frequency having a corresponding period TC, whereas memory clock CLKM may operate at a second frequency having a corresponding period TM. In the example of FIG. 3, the frequency of controller clock CLKC may be one fourth of the frequency of memory clock CLKM, and each clock cycle of controller clock CLKC may correspond to a set of four memory clock cycles. However, in general, the frequency of controller clock CLKC may be lower than the frequency of memory clock CLKM. For example, controller clock CLKC may operate at one half, one fourth, one eighth, or any desired fraction of the frequency of memory clock CLKM.

Controller clock CLKC may process memory access requests from logic circuits to produce controller commands at each controller clock cycle (e.g., by adjusting the value of control signal CMDC). Row commands and column commands may be merged at the memory controller to form controller commands, which may help improve performance. In other words, multiple memory commands may be provided by memory controller 28 to memory interface circuit in each controller clock cycle. In the example of FIG. 3, a controller command including a row command (ROW) and a column command (COL) may be issued to memory interface circuit 26 during a single controller clock period TC (e.g., during a single controller clock cycle). As an example, an activate command may be merged with a subsequent read or write command.

Memory interface circuit 26 may receive controller commands from memory controller 28 and process the controller commands to produce memory commands at desired memory clock cycles. Command circuitry 30 may process the merged controller commands to identify the row and column commands of the controller commands. The identified row and column commands may be provided to the memory module at the desired memory clock cycles. In the example of FIG. 3, memory interface circuit 26 may provide the row command to memory module 22 at the second memory clock cycle, whereas the column command may be provided to memory module 22 at the fourth memory clock cycle. This example is merely illustrative. If desired, memory interface circuit 26 may be configured via static control signals from programmable elements 20 or may be dynamically controlled (e.g., during normal operation of integrated circuit 10) via path 31. Memory interface circuit 26 may be controlled or configured to produce row and column commands at any desired memory clock cycle within a controller clock cycle.

The example of FIG. 3 in which memory commands are issued by memory interface circuit 26 every two memory clock cycles while memory controller 28 operates at a reduced clock speed may sometimes be referred to as quasi-2T operation (e.g., because memory interface circuit 26 can issue one memory command for every two memory clock cycles even though memory controller 28 requires four memory clock cycles to issue each controller command). If desired, memory interface circuitry 24 may operate using other arrangements such as quasi-1T arrangements in which memory interface circuit 26 issues memory commands every memory clock cycle. The example of FIG. 3 is merely illustrative. In quasi-2T, quasi-1T, and other quasi-type operations, row and column commands are issued during predetermined memory clock cycles within corresponding controller clock cycles. By operating memory interface circuit 26 and/or memory controller 28 in quasi-type operations may help to reduce processing load at memory controller 28 (e.g., because memory controller 28 is not required to issue commands at every memory clock cycle), which tends to help reduce implementation complexity and cost.

Figure 4:
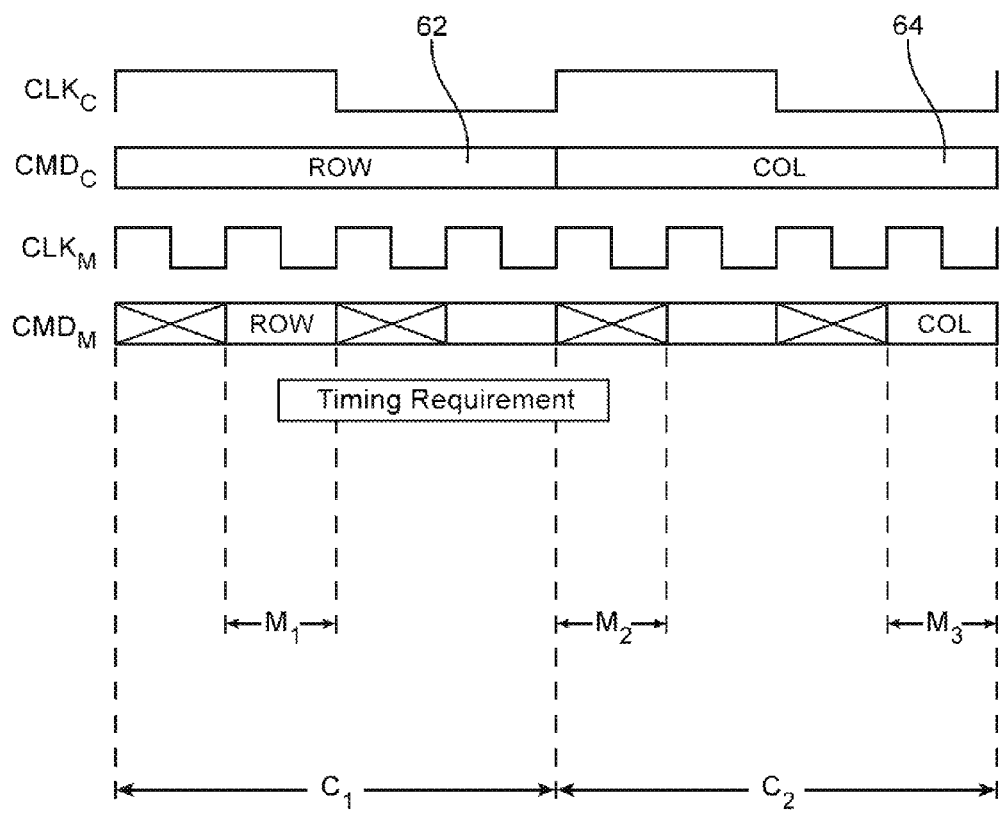
FIG. 4 is an illustrative timing diagram showing how memory interface circuitry may be configured to satisfy row-to-column timing requirements in accordance with an embodiment of the present invention.

Memory commands may be subject to timing constraints that depend on characteristics of memory module 22. For example, memory module 22 may require at least a predetermined delay between a row command and a subsequent column command (sometimes referred to as a row-to-column delay). The row-to-column delay may, for example, correspond to the time required for memory module 22 to open a row in preparation for column access. FIG. 4 is an illustrative timing diagram showing how memory interface circuitry 24 may operate while satisfying row-to-column delay requirements. In the example of FIG. 4, memory module 22 may require a row-to-column delay of three memory clock cycles and command circuitry 30 may be configured to provide row signals at the second memory clock cycle within a respective controller clock cycle and provide column signals at the fourth memory clock cycle within the controller clock cycle.

Memory controller 28 may identify a row command and a column command based on a memory access request received from logic circuits 18. Memory controller 28 may determine whether the row and column commands can be merged based on timing requirements of memory module 22 and the configuration of command circuitry 30. Row command ROW must be provided to memory module 22 at the second memory clock cycle within controller clock cycle C1 (i.e., memory clock cycle M1). In this scenario, the row-to-column timing requirements of memory module 22 require that column command COL is delayed three memory clock cycles (i.e., column command COL must be provided at memory clock cycle M2 or later). Memory clock cycle M2 corresponds to controller clock cycle C2. Memory controller 28 may therefore determine that the row and column commands cannot be merged and may subsequently issue controller command 62 including row command ROW at controller clock cycle C1 and controller command 64 including column command COL at controller clock cycle C2.

Figure 5:
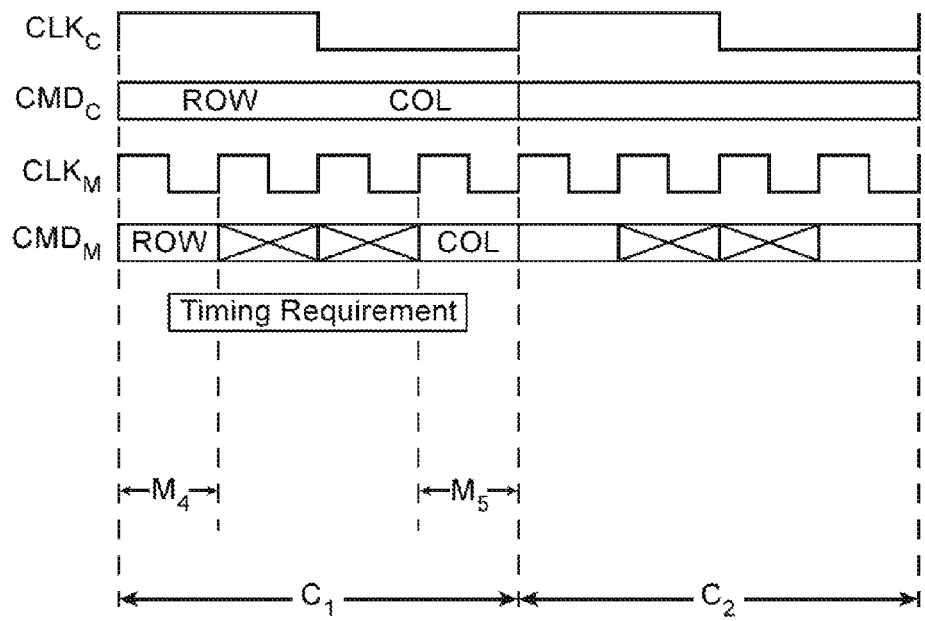
FIG. 5 is an illustrative timing diagram showing how memory interface circuitry may be configured with a memory command placement for improved performance in accordance with an embodiment of the present invention.

Command circuitry 30 may be configured to provide improved memory access throughput and improved command ordering for the timing requirements of FIG. 4. FIG. 5 is an illustrative timing diagram showing how command circuitry 30 may be configured to re-order memory commands for improved performance given the timing requirements of FIG. 4 (e.g., for a memory module 22 that requires a three memory clock cycle delay between receiving row and column commands).

In the example of FIG. 5, command circuitry 30 may be configured to provide row commands during the first memory clock cycle within a respective controller clock cycle and provide column commands during the fourth memory clock cycle within the controller clock cycle. In this scenario, memory controller 28 may determine that sequential row and column commands may be merged and provided to memory interface circuit 26 during controller clock cycle C1. Command circuitry 30 may receive the merged controller command and assign the row command to the first memory clock cycle within controller clock cycle C1 (i.e., memory clock cycle M4). The column command may be assigned to the fourth memory clock cycle within controller clock cycle C1 (i.e., memory clock cycle M5).

By configuring command circuitry 30 based on timing requirements of memory module 22, row and column commands may be merged and issued within a single controller clock cycle, which may result in improved memory interface performance. For example, additional commands may be issued during controller clock cycle C2.

In some scenarios, it may be desirable to ensure that sequential row and column commands are issued on different controller clock cycles. For example, as memory clock frequency increases, it may be difficult for memory controller 28 to process memory access requests, even when operating at a fraction of the memory clock speed. By issuing sequential row and column commands at different controller clock cycles, memory controller 28 may be provided with additional time to process memory access requests (e.g., to accommodate latency requirements of memory controller 28).

Figure 6:
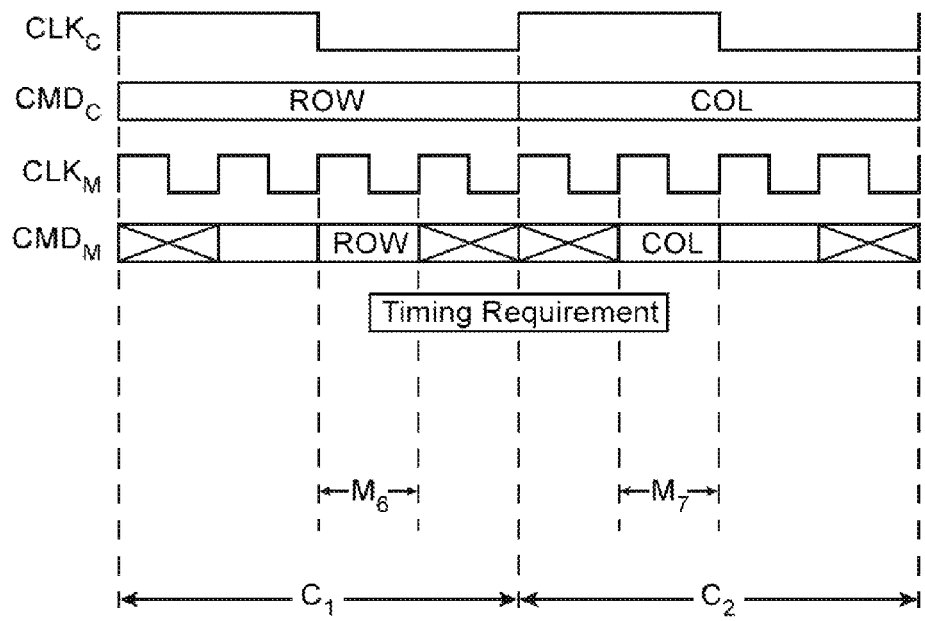
FIG. 6 is an illustrative timing diagram showing how memory interface circuitry may be configured with a memory command placement for increased controller latency in accordance with an embodiment of the present invention.

FIG. 6 is an illustrative timing diagram showing how command circuitry 30 may be configured based on memory module timing requirements to provide memory controller 28 with additional processing time. In the example of FIG. 6, command circuitry 30 may be configured to provide row commands on the third memory clock cycle of each controller clock cycle and column commands on the second memory clock cycle of each controller clock cycle. Memory controller 28 may determine that row and column commands cannot be merged (e.g., based on the configuration of command circuitry 30 and memory module timing requirements) and may issue row and column commands at different controller clock cycles C1 and C2.

By configuring command circuitry 30 to ensure that subsequent row and column commands are issued at different controller clock cycles, memory controller 28 may be provided with an additional controller clock cycle for processing memory access requests (e.g., to produce column commands). For example, row and column commands ROW and COL may be produced from a single memory access request received from logic circuits 18. In this scenario, it may be difficult for memory controller 28 to process the received memory access request and generate the ROW and COL commands in time for clock cycle C1. However, in the scenario of FIG. 6, controller 28 can use the additional time during clock cycle C1 to produce column command COL.

The controller clock frequency may be increased when subsequent row and column commands are issued at different controller clock cycles, which results in a reduced clock period for memory controller 28 to process memory access requests (e.g., to generate row and column commands based on the memory access requests). However, the reduced clock period may be offset by the use of an additional clock period to produce column commands. By increasing the controller clock frequency, increased memory clock frequencies may also be accommodated. In other words, by ensuring that row and column commands are issued at different controller clock cycles, increased memory and controller clock speeds may be accommodated.

Figure 7:
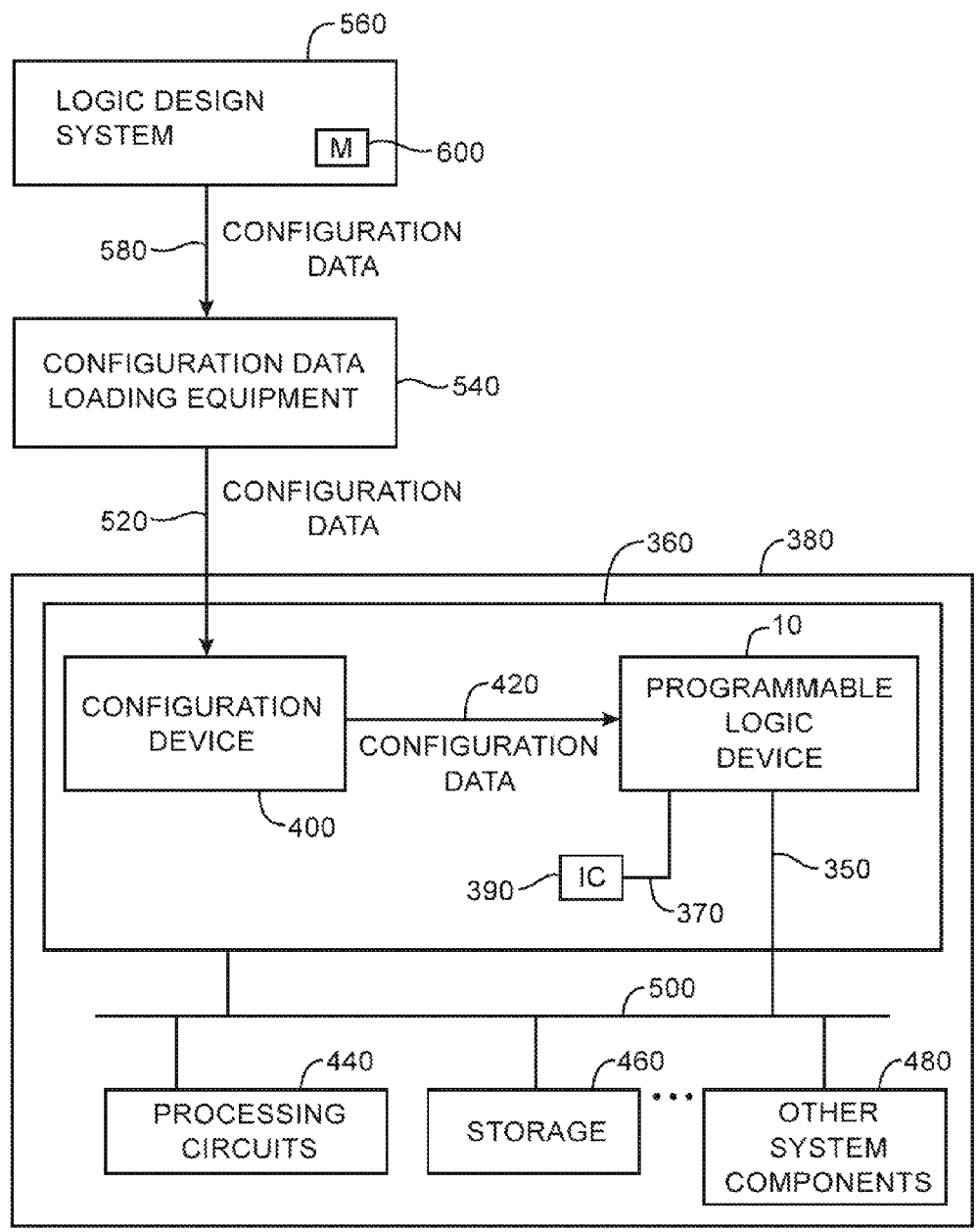
FIG. 7 is a diagram of an illustrative system environment in which a logic design system may be used to configure a programmable integrated circuit in accordance with an embodiment of the present invention.

An illustrative system environment for integrated circuits such as programmable integrated circuits is shown in FIG. 7. Device 10 may be mounted on a board 360 in a system 380. Device 10 may receive configuration data from programming equipment or from any other suitable equipment or device.

In the example of FIG. 7, device 10 is a type of programmable integrated circuit that receives configuration data from an associated integrated circuit 400. With this type of arrangement, circuit 400 may, if desired, be mounted on the same board 36 as device 10. Circuit 400 may be a programmable logic device configuration data loading chip that loads configuration data into programmable logic device memory from an external electrically erasable-programmable read-only memory (EEPROM) chip, a programmable logic device configuration data loading chip with built-in memory (sometimes referred to as a configuration device), or any other suitable device. When system 380 boots up (or at another suitable time), the configuration data may be supplied to device 10 from device 400, as shown schematically by path 420. The configuration data that is supplied to device 10 may be stored in its configuration random-access-memory elements 20 (see, e.g., FIG. 1) for use during normal operation of device 10.

System 380 may include processing circuits 440, storage 460, and other system components 480 that communicate with device 10. The components of system 380 may be located on one or more boards such as board 360 or other suitable mounting structures or housings.

Communication paths may be used to interconnect device 10 to other components. For example, communication path 370 may be used to convey data between an integrated circuit 390 that is mounted on board 360 and device 10. Communication paths 350 and 500 can be used to convey signals between device 10 and components 440, 460, and 480.

Configuration device 400 may be supplied with the configuration data for device 10 over a path such as path 520. Configuration device 400 may, for example, receive the configuration data from configuration data loading equipment 540 or other suitable equipment that stores the configuration data in configuration device 400. Device 400 may be loaded with data before or after installation on board 360.

It can be a significant undertaking to design and implement a desired logic circuit in a programmable logic device. Logic designers therefore generally use logic design systems based on computer-aided-design (CAD) tools to assist them in designing circuits. A logic design system (sometimes referred to as a circuit design system) can help a logic designer design and test complex circuits for a system. When a design is complete, the logic design system may be used to generate configuration data for electrically programming the appropriate programmable logic device. The logic design system may be implemented on computing equipment. The logic design system may be used to optimize command placement for memory interface circuitry in device 10 based on timing requirements and latency requirements. The memory interface circuitry may be configured with the optimized command placement (e.g., by loading appropriate configuration data into programmable elements 20 that configures command circuitry in the memory interface circuitry).

As shown in FIG. 7, the configuration data produced by a logic design system 560 may be provided to equipment 540 over a path such as path 580. Equipment 540 provides the configuration data to device 400 so that device 400 can later provide this configuration data to device 10 over path 420. System 560 may be based on one or more computers and one or more software programs. In general, software and data may be stored on any computer-readable medium (storage) in system 560 and is shown schematically as storage 600.

In a typical scenario, logic design system 560 is used by a logic designer to create a custom circuit design. The system 560 produces corresponding configuration data which is provided to configuration device 400. The configuration data may include configuration data for memory interface circuitry on device 10. Upon power-up, configuration device 40 and data loading circuitry on device 10 is used to load the configuration data into the programmable memory elements 20 of device 10. Device 10 may then be used in normal operation of system 38.

Figure 8:
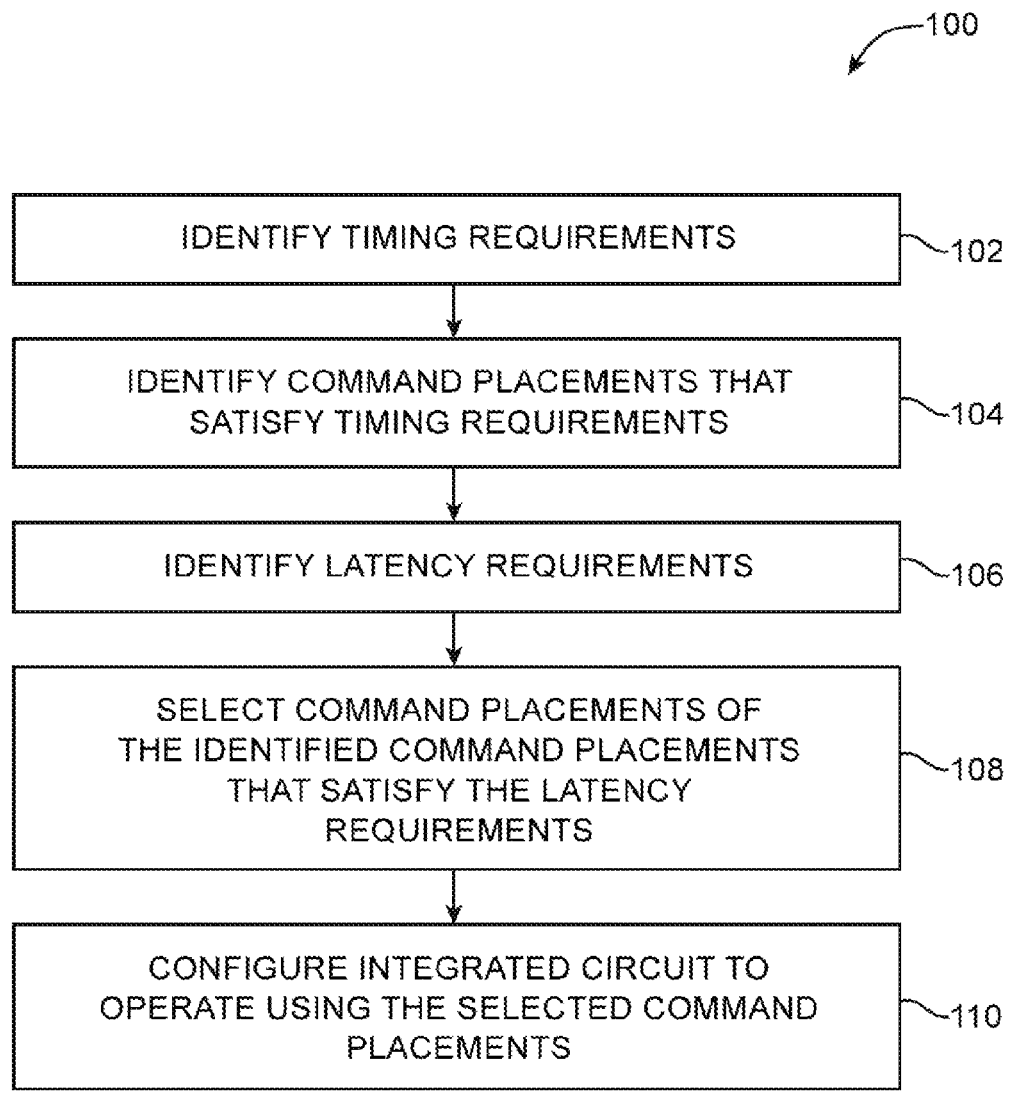
FIG. 8 is flow chart of illustrative steps that may be performed by a logic design system to determine a command placement configuration for an integrated circuit based on timing and latency requirements in accordance with an embodiment of the present invention.

FIG. 8 is a flowchart of illustrative steps that may be performed by a logic design system such as system 560 to optimize placement of commands within controller clock cycles (e.g., which memory clock cycles within the controller clock cycle are assigned to different types of commands).

During step 102, the logic design system may identify timing requirements. For example, timing requirements associated with memory module 22 such as row-to-column delay requirements may be identified. If desired, the timing requirements may be provided by a user as part of a custom logic design (e.g., the custom logic design may identify requirements of memory that should be used with the custom logic design).

During step 104, the logic design system may identify command placement configurations that satisfy the timing requirements. For example, command placement configurations such as the configurations of FIG. 5 and FIG. 6 may be identified for a scenario in which a row-to-column delay of three memory clock cycles is required.

During step 106, the logic design system may identify latency requirements associated with a memory controller. The latency requirements may be used to determine whether controller commands should include multiple memory commands (e.g., for reduced controller latency) or whether successive memory commands should be provided at different clock cycles (e.g., for increased controller latency). The latency requirements may be user-defined as part of a custom logic design.

During step 108, the logic design system may select command placements of the identified command placements that satisfy the latency requirements. For example, in a scenario in which a row-to-column delay of three memory clock cycles is required and a minimum controller latency is desired, the configuration of FIG. 5 may be selected, which may improve memory controller command throughput (e.g., the rate at which memory controller commands can be issued by the memory controller). Alternatively, if maximum controller latency is desired, the configuration of FIG. 6 may be selected, which may allow for increased controller and memory clock speeds.

Figure 9:
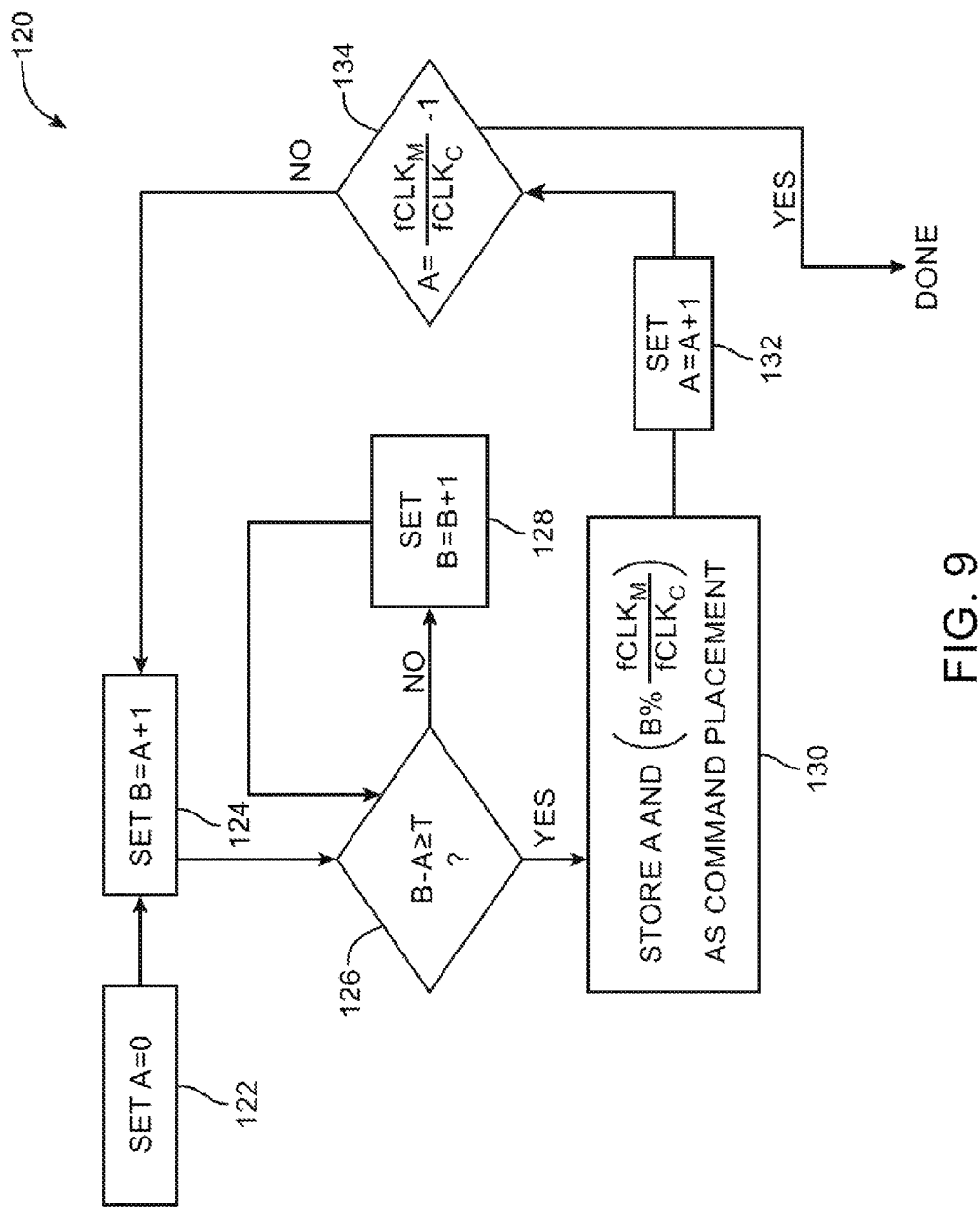
FIG. 9 is a flow chart of illustrative steps that may be performed to identify command placements that satisfy timing requirements in accordance with an embodiment of the present invention.

FIG. 9 is a flow chart 120 of illustrative steps that may be performed using a logic design system to identify command placements that satisfy timing requirements. The steps of flow chart 120 may, for example, be performed during step 104 of FIG. 8. In the example of FIG. 9, a set of memory clock cycles corresponding to a controller clock cycle may be indexed in sequential order. Index A may correspond to command placement for row commands, whereas index B may correspond to command placement for COL commands.

During step 122, index A may be initialized to zero (e.g., index A may correspond to the first memory clock cycle within each controller clock cycle).

During step 124, index B may be set to the memory clock cycle subsequent to index A (e.g., B=A+1).

During step 126, the logic design system may determine whether timing requirement T is satisfied. Timing requirement T may, for example, represent the number of memory clock cycles required by memory module 22 between subsequent row and column commands (e.g., T may represent a row-to-col delay requirement). The logic design system may determine whether timing requirement T is satisfied by determining whether index B minus index A is greater than or equal to T (e.g., whether the number of clock cycles separating B and A is greater than or equal to T). If timing requirement T is satisfied, the operations of step 130 may be performed. If timing requirement T is not satisfied, the operations of step 128 may be performed to increment B (e.g., by setting B=B+1).

During step 130, the command placement configuration corresponding to index A and index B may be stored by the logic design system. The column command location of the command placement configuration may be stored as the remainder of B divided by how many memory clock periods are within a controller clock period. In other words, the column command location may be calculated as B modulo the ratio between the frequency of memory clock CLKM and the frequency of controller clock CLKC (i.e., B modulo fCLKM divided by fCLKC).

During step 132, the logic design system may increment index A (e.g., by setting A=A+1). During step 134, the logic design system may determine whether each possible command placement configuration has been processed (e.g., by determining whether A=fCLKM/fCLKC−1). If each possible command placement configuration has been processed, the process may be complete. If command placement configurations have yet to be processed, the process may return to step 124.

Figure 10:
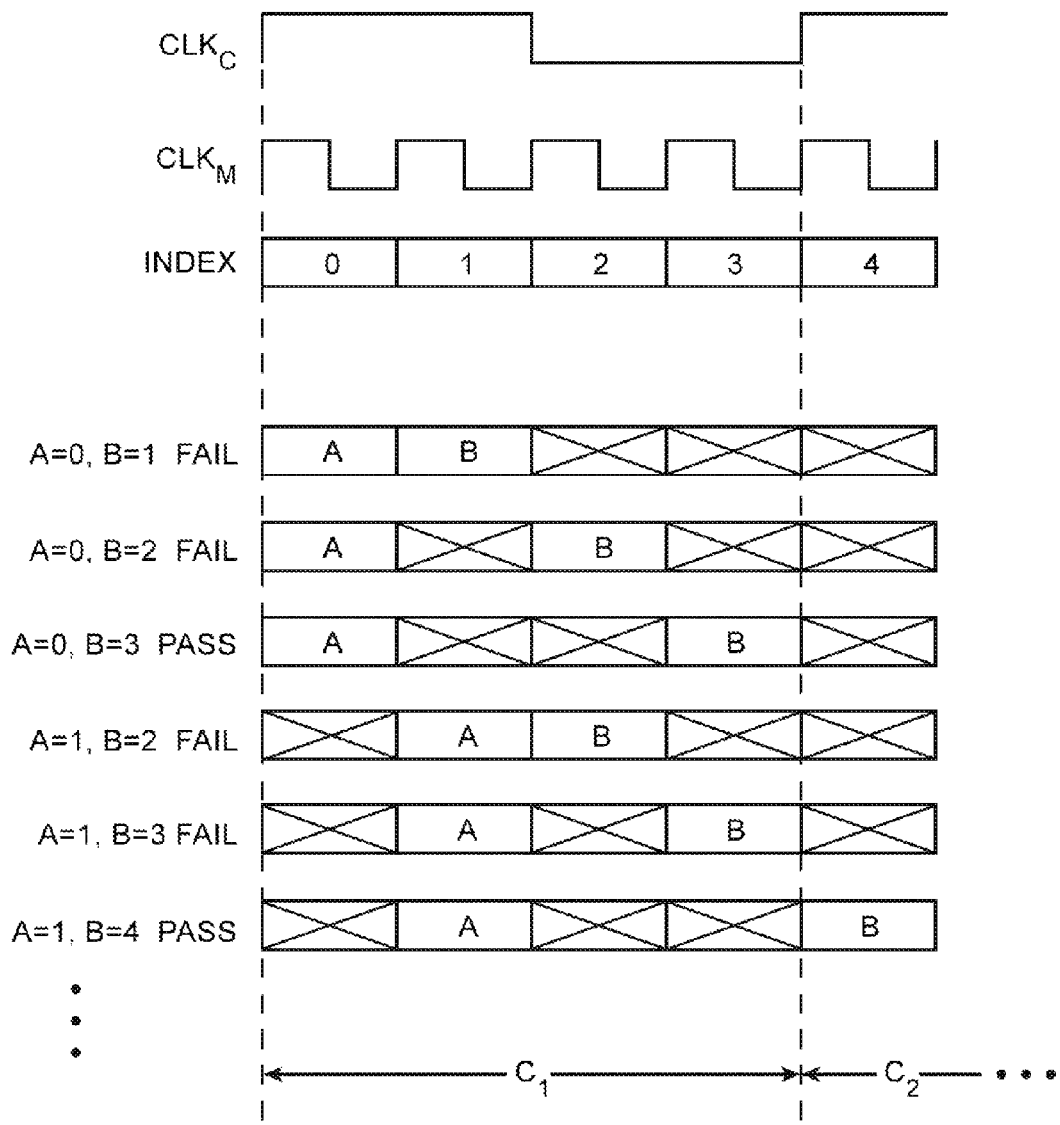
FIG. 10 is an illustrative timing diagram showing how command placement configurations that pass timing requirements may be identified in accordance with an embodiment of the present invention.

FIG. 10 is an illustrative diagram showing how logic design system 560 may perform the steps of flow chart 120 for a scenario in which T is three. FIG. 10 may, for example, be performed for a memory module 22 that requires a three memory clock cycle delay between receiving row and column commands.

As shown in FIG. 10, the logic design system may initially set A=0 and B=1 (steps 122 and 124). The logic design system may determine that this configuration fails timing requirements, because B−A=1, which is less than T (step 126). The logic design system may subsequently update B (step 128) and determine that the scenario in which A=0 and B=2 also fails timing requirement T. The logic design system may subsequently update B (step 128) and determine that the scenario in which A=0 and B=3 passes timing requirement T (e.g., because B−A=3). The logic design system may store the A=0 and B=3 configuration (step 130) and subsequently increment A to 1 (step 132). The logic design system may continue to process steps 124-134 to identify that the A=1 and B=2 configuration fails timing requirements, the A=1 and B=3 configuration fails timing requirements, and that the A=1 and B=4 configuration passes timing requirements. The logic design system may store a command placement configuration for the A=1 and B=4 scenario in which row commands are assigned to the second memory clock period of each controller clock period (INDEX=1) and in which column commands are assigned to the first memory clock period of each controller clock period (e.g., because B % the number of memory clock periods in each controller clock period is zero).

In the scenario of FIG. 10, the logic design system may select command placements that also satisfy latency requirements (e.g., step 108 of FIG. 8). The configuration with the minimum value for index B may be selected for minimum controller latency. For example, the command placement configuration associated with A=0 and B=3 may be selected for minimum latency (e.g., so that row and column commands are issued at the same controller clock cycle C1), because B=3 may be the minimum value of B that also passes timing requirements. The configuration with a maximum value for index B may be selected for maximum controller latency. For example, the command placement configuration associated with A=0 and B=4 may be selected for maximum latency (e.g., so that row and column commands are issued at different controller clock cycles C1 and C2), because B=4 may be the maximum value of B that also passes timing requirements.

The example of FIG. 8 and FIG. 9 in which a logic design system such as system 560 is used to optimize memory command placement based on timing and latency requirements is merely illustrative. If desired, memory command placement may be controlled by circuitry on device 10 during normal operation. For example, logic circuits 18 may be configured to control memory command placement via control paths 31. In this scenario, the memory command placement may be modified during normal operation. Control circuitry 33 may, for example, perform steps 102-108 of FIG. 8 and produce control signals that control which memory clock cycles in which memory commands are issued by memory interface circuit 26. Control circuitry 33 may adjust the value of control signals dynamically during normal operation. For example, control circuitry 33 may adjust the value of control signals in response to changes in controller latency requirements.

If desired, memory commands other than row and column commands may be adjusted to satisfy timing and/or latency requirements. For example, refresh commands related to refreshing data stored in portions of memory may be subject to timing requirements that require periodic refreshing. The refresh commands may be issued by a memory controller periodically (e.g., at substantially fixed time intervals) and may be assigned to unused memory clock cycles with selected controller clock cycles (e.g., clock cycles that are not reserved for row or column commands). The memory clock cycles assigned to the refresh commands may be determined during steps 102-108 of FIG. 8 to satisfy the timing requirements. This example is merely illustrative. In general, any desired memory command that is subject to timing and/or latency requirements may be adjusted by performing the steps of FIG. 8 to help optimize memory command throughput.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using computing equipment to configure an integrated circuit that is operable to communicate with memory by issuing memory commands to rows and columns of the memory, the method comprising:
 identifying timing requirements associated with issuing the memory commands to the rows and columns of the memory, wherein the timing requirements specify a minimum delay between successive memory commands to the rows and columns of the memory;
 determining at least one command placement configuration that satisfies the timing requirements, wherein the at least one command placement configuration identifies when the memory commands to the columns of the memory should be issued to the memory based on when the memory commands to the rows of the memory are issued; and
 configuring the integrated circuit with the command placement configuration.

2. The method defined in claim 1 wherein the row commands access the rows of the memory, wherein column commands access the columns of the memory, and wherein determining the at least one command placement configuration comprises:

determining when the row commands should be issued to the memory; and determining when the column commands should be issued to the memory, wherein the column commands are issued after the row commands are issued.

3. The method defined in claim 2 wherein the integrated circuit includes a memory controller that operates based on controller clock cycles, wherein the memory operates based on memory clock cycles, wherein each controller clock cycle corresponds to a respective set of the memory clock cycles, and wherein determining when the row commands should be issued to the memory comprises:

determining which memory clock cycle of each set of memory clock cycles in which to issue the row commands to the memory.

4. The method defined in claim 3 wherein determining when the column commands should be issued to the memory comprises:

determining which memory clock cycle of each set of memory clock cycles in which to issue the column commands to the memory.

5. The method defined in claim 4 wherein the integrated circuit includes a memory interface circuit that interfaces between the memory controller and the memory, wherein the memory controller provides controller commands to the memory interface circuit, wherein the memory interface circuit is operable to provide the row and column commands to the memory based on the controller commands, and wherein determining the command placement configuration comprises:

determining the command placement configuration based at least partly on controller latency requirements.

6. The method defined in claim 5 wherein determining the command placement configuration based at least partly on controller latency requirements comprises:

determining the command placement configuration so that column commands that follow the row commands are issued by the memory interface circuit during different controller clock cycles.

7. The method defined in claim 5 wherein determining the command placement configuration based at least partly on controller latency requirements comprises:

determining the command placement configuration so that delay between the row commands and subsequent column commands is minimized while satisfying the timing requirements.

8. The method defined in claim 5 wherein determining the at least one command placement configuration that satisfy the timing requirements comprises:

identifying a plurality of command placement configurations that satisfy the timing requirements; and selecting a command placement configuration of the plurality of command placement configurations that satisfies the controller latency requirements.

9. The method defined in claim 2 wherein identifying the timing requirements associated with the memory comprises:

identifying row-to-column timing requirements that are associated with the memory, wherein the row-to-column timing requirements identify how much delay is required between the row commands and subsequent column commands.

10. The method defined in claim 9 wherein determining the command placement configuration further comprises:

determining the command placement configuration so that timing of the row and column commands satisfies the row-to-column timing requirements.

11. An integrated circuit that communicates with memory that operates using a memory clock, the integrated circuit comprising:

a memory controller that operates based on a controller clock, wherein the memory controller receives a memory access request and produces a controller command based on the received memory access request at a controller clock cycle of the controller clock and wherein the controller clock cycle is concurrent with a set of memory clock cycles of the memory clock;

control circuitry that selects memory clock cycles from the set of memory clock cycles that are concurrent with the controller clock cycle; and a memory interface circuit that receives the controller command from the memory controller and provides memory commands based on the controller command at the selected memory clock cycles.

12. The integrated circuit defined in claim 11 wherein the control circuitry adjusts which memory clock cycles of the set of memory clock cycles are selected during normal operation of the integrated circuit.

13. The integrated circuit defined in claim 11 wherein the control circuitry determines which memory clock cycles of the set of memory clock cycles are selected based on timing requirements associated with providing the memory commands to the memory.

14. The integrated circuit defined in claim 13 wherein the memory is organized in rows and columns, wherein the memory commands include a row command associated with accessing a row of the memory and a subsequent column command associated with accessing a column of the memory and wherein the timing requirements comprise row-to-column timing requirements that identify a minimum delay between providing the row command to the memory and providing the subsequent column command to the memory.

15. The integrated circuit defined in claim 14 wherein the control circuitry selects a first memory clock cycle of the set of memory clock cycles for the row command and selects a second memory clock cycle of the set of memory clock cycles for the column command so that delay between the first and second memory clock cycles is at least the minimum delay.

16. The integrated circuit defined in claim 11 wherein the control circuitry determines which memory clock cycles of the set of memory clock cycles are selected based on controller latency associated with processing the received memory access request to produce the controller command.

17. A method of configuring an integrated circuit using logic design computing equipment, wherein the integrated circuit includes memory interface circuitry that is operable to communicate with memory by issuing memory commands to the memory and wherein the memory commands are issued during a set of memory clock cycles, the method comprising:

using the logic design computing equipment to select memory clock cycles from the set of memory clock cycles in which each of the memory commands should be issued, wherein the memory operates using a memory clock which produces the set of memory clock cycles; and using the memory interface circuitry to issue the memory commands at the selected memory clock cycles.

18. The method defined in claim 17 wherein the memory is organized in rows and columns, wherein the memory commands include row commands for accessing rows of the memory and column commands for accessing columns of the memory, and wherein selecting the memory clock cycles in which each of the memory commands should be issued comprises:
   selecting a first set of memory clock cycles in which the row commands should be issued; and
   selecting a second set of memory clock cycles in which the column commands should be issued.

19. The method defined in claim 18 wherein selecting the memory clock cycles in which each of the memory commands should be issued further comprises:
   selecting memory clock cycles in which the row and column commands should be issued based on timing requirements of the memory.

20. The method defined in claim 17 wherein the integrated circuit includes programmable logic, the method further comprising:
   receiving a custom user design for the integrated circuit; and
   configuring the programmable logic with the custom user design.

21. The method defined in claim 17 wherein the memory commands comprise refresh commands and wherein selecting the memory clock cycles in which each of the memory commands should be issued comprises:
   selecting memory clock cycles in which each of the refresh commands should be issued.

* * * * *